(12) United States Patent
Ben Ayed (10) Patent No.: US 8,595,810 B1
(45) Date of Patent: Nov. 26, 2013

(54) METHOD FOR AUTOMATICALLY UPDATING APPLICATION ACCESS SECURITY

(71) Applicant: Mourad Ben Ayed, Cupertino, CA (US)

(72) Inventor: Mourad Ben Ayed, Cupertino, CA (US)

(*) Notice: Subject to any disclaimer, the term of this patent is extended or adjusted under 35 U.S.C. 154(b) by 0 days.

(21) Appl. No.: 13/740,200

(22) Filed: Jan. 13, 2013

(51) Int. Cl.
*H04L 29/06* (2006.01)

(52) U.S. Cl.
USPC .............. 726/8; 726/1; 726/2; 726/3; 726/4; 726/5; 713/168; 713/169; 713/170; 713/171; 713/172

(58) Field of Classification Search
USPC ............................................ 726/8
See application file for complete search history.

(56) References Cited

U.S. PATENT DOCUMENTS

| | | | |
|---|---|---|---|
| 7,907,935 B2* | 3/2011 | Le Saint et al. | 455/411 |
| 8,045,961 B2 | 10/2011 | Ayed | |
| 2003/0105725 A1 | 6/2003 | Hoffman et al. | |
| 2009/0104888 A1 | 4/2009 | Cox et al. | |
| 2009/0221266 A1 | 9/2009 | Ohta et al. | |
| 2009/0271847 A1* | 10/2009 | Karjala et al. | 726/6 |
| 2012/0210443 A1 | 8/2012 | Blaisdell et al. | |
| 2012/0246484 A1 | 9/2012 | Blaisdell et al. | |
| 2012/0246731 A1 | 9/2012 | Blaisdell et al. | |
| 2012/0304310 A1 | 11/2012 | Blaisdell et al. | |

* cited by examiner

*Primary Examiner* — Longbit Chai
(74) *Attorney, Agent, or Firm* — Daniel B. Schein (57) ABSTRACT

A method for automatically updating access security on existing applications with multi-factor authentication, intelligent auto-login, single sign-on, proximity logout, pro-active loss prevention and real-time incident notification using a wrapping function.

20 Claims, 4 Drawing Sheets

METHOD FOR AUTOMATICALLY UPDATING APPLICATION ACCESS SECURITY

PRIORITY

The present application is a Continuation-In-Part ("CIP") of pending U.S. patent application Ser. No. 13/689,760, filed Nov. 30, 2012.

FIELD OF THE INVENTION

The present invention relates to methods and systems for automatically enabling existing applications with robust access security including multi-factor authentication, intelligent auto-login, proximity logout, pro-active loss prevention, real-time incident notification and single sign-on.

BACKGROUND

Mobile tablets are growing significantly in the enterprise, and are presenting new security and usability challenges.

Multi-factor access authentication technologies are difficult to use with mobile devices due to frequent timeout. For example, a person would have to type RSA SecurID tokens 20 to 30 times a day. Also, smart cards require hooking a reader to the mobile terminal. Furthermore, finger print readers have a high failure rate and inconvenient.

It is also noted that traditional two-factor authentication technologies cannot protect the device from loss. Also, when a device is lost, the user session may stay open, and can be exploited by the person who finds the device.

This invention caters to a very sophisticated enterprise mobile security problem, and requires a sophisticated orchestration of common technologies in order to provide high security with high usability. Numerous large companies have tried to solve the mobile security problem, with no good success.

Previous patents by the current inventor taught authentication based on Bluetooth proximity as well as proximity logout, auto-login, multi-factor authentication, however, the prior art does not teach automatically injecting multi-factor capability and access control to applications. They do not teach converting access security on legacy applications, and providing single sign-on.

U.S. Pat. No. 8,045,961 by the current inventor, System for wireless authentication based on Bluetooth proximity, teaches a Bluetooth device that facilitates login using a Bluetooth device that stores the user credentials and that supplies them wirelessly over Bluetooth communication channel. It does not teach automatic login if the Bluetooth channel stayed above a threshold during a recent period of time, otherwise, asking for user credentials. It does not teach converting access security on legacy applications, and providing single sign-on.

US patent applications 20120210443 by Blaisdell et al Securing and managing apps on a device teaches wrapping an application with a security layer. It teaches adding a light security layer that can be used by administrators as well as parents such as geo-fencing (to set policies on app downloaded by children). It does not teach updating access security on an existing application or adding robust multi-factor authentication and single sign on to enterprise applications.

US patent applications 20120304310, 20120246731 and 20120246484 by Blaisdell et al, Secure execution of unsecured apps on a device, teach modifying security parameters of an application. It teaches adding a light security layer that can be used by administrators as well as parents (to set policies on app downloaded by children). It does not teach updating access security on an existing application or adding robust multi-factor authentication and single sign on to enterprise applications.

Injecting code into an existing application to change its behavior is known in the prior art and in the hacker community. Mocana for example offers a commercial service that wraps applications with geo-fencing and other data security functions. The current invention uses the wrapping concepts to automatically update access security in a uniform way on multiple applications. It ties an application to a second authentication device, injects passwords into an application and triggers login. The wrapping engine enables to insert these functions automatically, and to upgrade all the applications of an enterprise. Moreover, the wrapping engine enables to provide single sign-on across all applications. It is worth mentioning that the wrapping engine now enables a uniform way to control all application access using a configuration console: proximity logout enables to ensure that applications are automatically closed, proactive loss prevention ensures that company devices are protected, and real-time notification ensures that IT is alerted in real time when an incident occurs.

Previous patents and patent applications by the current inventor introduced multi-factor authentication and proximity logout, however they required developers to insert multi-factor authentication. This resulted in enterprises not being able to apply one single access security layer to all existing and future applications.

Most MDM (Mobile Device Management) and MAM (Mobile Application Management) solutions on the market today (Good, Mobile Iron, AirWatch, Zenprise, Bitzer, Tangoe, Symantec . . . ) cannot provide adequate device security and application access security:

Usability: Users have to login to their email application and calendar on their mobile device every time they need something. They need to first enter the PIN code to unlock their device, and then enter the password for the email client such as Good. This is extremely annoying as the user has to enter password 20-30 times a day, twice every time. Intelligent auto-login is needed.

Device loss: MDM, MAM . . . are not aware when a device is left behind, and are incapable of securing the device. Proximity alarm is needed.

Session is left un-attended: Most MDM and MAM can secure the data, but cannot secure access. They are incapable of authenticating the user, or detecting that a user swap has occurred. If a user connects to an enterprise portal, and leaves the device on a table to go to restrooms, anybody that finds the device has un-restricted access the network. Proximity logout is needed.

Theft of a device after the user is logged in: High profile people using tablets are high targets for theft. The thief waits till the target logs in to the system, and then takes the tablet away. Most MDM and MAM solutions are incapable of addressing this problem as they cannot detect user swap. Proximity logout and proximity alarm are needed.

Remote wipe: While most MDM solutions provide remote wipe capability, they are ineffective in remote wiping the data. That is because when an employee looses a mobile device (iPad, Android . . . ); it generally takes him/her several hours to notice the loss. After that, the employee will take several hours/days to report the loss, and may never report it. When IT tries to remote wipe the device, the device is most probably out of reach, out of battery, or out of SIM card. A hacker would have found plenty of time to get the data off the device, or use the device for un-appropriate access. Real-time incident notification is needed.

The essence of the current invention is to modify the access security layer of any application automatically, using a wrapper engine in order to add: 1) multi-factor authentication 2) intelligent auto-login 3) proximity logout 4) pro-active loss prevention and 5) real-time incident notification and 5) single sign-on.

The essence is to modify access security in order to provide more access security with better usability. The essence is also to guarantee that security of the data and device is maintained under all conditions, including when the user of the device is not able to attend to the device.

Thus, a need exists for systems for automatically updating security of an application.

SUMMARY OF THE INVENTION

A method for updating security of a first application comprising:
combining at least one part of the first application object code with at least one object code corresponding to a security layer and generating a second secure application,
wherein the security layer provides automatic login function;
whereby when the second secure application runs on a first terminal:
the second secure application obtains a pass code from a remote storage device and uses the pass code to provide access to a first login interface,
wherein the first login interface corresponds to a login interface of the first application, the second secure application displays a second user interface,
wherein the second user interface corresponds to a user interface of the first application, wherein the second user interface is different from the first login interface.

A method for updating security of a first application comprising:
combining at least one part of the first application object code with at least one object code corresponding to a security layer and generating a second secure application;
whereby the security layer provides at least one Bluetooth communication function;
whereby when the second secure application runs on a first terminal,
the second secure application obtains an identifier for a remote token device from a remote storage device and attempts to connect to the remote token device using Bluetooth protocol.

A method for updating security of a first application comprising:
after receiving a user request for access to the first application running onboard a first terminal: obtain an identifier from a remote storage device and connect to a remote token device using Bluetooth protocol,
wherein the remote token device corresponds to the identifier;
whereby if the remote token device was previously connected to a second terminal that is different from the first terminal, provide a user access to the first application without requesting any input from the user; whereby if the remote token device was previously connected to the first terminal, provide a user access to the first application without requesting any input from the user.

BRIEF DESCRIPTION OF THE FIGURES

The present inventions may be more clearly understood by referring to the following figures and further details of the inventions that follow.

FURTHER DETAILS OF THE INVENTIONS

This patent teaches a method for updating access security of existing applications, enabling multi-factor authentication, intelligent auto-login, single sign-on, proximity logout, pro-active loss prevention and real-time incident notification using a script or wrapping service.

The current invention enables a uniform access security on all existing and future applications, total control, and total management of all application accesses. It enables security departments to control access security policies and multi-factor authentication without access to source code or developers. It enables security departments to control access to application, and to set authentication methods per application per user.

The system of the current invention uses the followings:
1—a configuration database for storing user and application specific security parameters, such as: user credentials for login, user's contact information, IT contact information, trusted locations . . . .
2—Bluetooth tokens that are synched with the configuration database
3—Wrapper engine
   i) script or application or web service that automatically wraps applications with a security layer that connects to a second Bluetooth enabled token for multi-factor authentication
   ii) automatically modifies the application logo to indicate the application is secured
   iii) the wrapper engine can upgrade any application to standards set by any institution or enterprise, for example, FFIEC, NIST, HIPAA, SOX, PCI or the U.S. Food and Drug Administration. It can put a logo or insert a flash screen of "approved by . . . " or "compliant with . . . ".
   iv) the wrapper engine can upgrade any application with reporting capabilities such as those that provide document compliance with U.S. Food and Drug Administration requirements. The reporting parameters are obtained from a database, and can include destination address.
   v) the wrapper can include password decryption algorithm for a specific application that enables to decrypt passwords obtained from the configuration database and encrypted specifically for that application.

The wrapped application synchs with the configuration database and uses Bluetooth to communicate with the Bluetooth token, get the user credentials and log the user to old applications. It provides single sign on to any application, and automatic proximity based login and logout. As long as the user is in proximity of a device, the user is considered authenticated. Only if the user leaves proximity of a device, or a timeout is reached is that user deemed no longer authenticated.

The application server or enterprise network is considered outside the current system as generally, the application server would be part of an existing legacy infrastructure. The current solution has great advantage in that is provides 1) enhanced access security 2) enhanced usability and 3) easy implementation. 4) It also provides functions that were known to be impossible to do.

1) Enhanced Access Security

The current invention uses a separate Bluetooth token device for access. It provides up to 6 factors of authentication: something you know=PIN, something you have=token, something in you=voice authentication, proximity to the terminal=Bluetooth proximity, location=GPS and motion=accelerometer The current invention further provides proximity logout, thus protecting the user session when the terminal is left un-attended, or when a person steals it after a session is open The current invention provides proximity alarm, and pro-actively protects the terminal against loss 2) Enhanced Usability The current invention reduces the number of times the user is authenticated. After the user is authenticated once (through PIN code, pass code, biometrics, voice authentication), the user remains trusted as long as the Bluetooth proximity does not detect a loss of proximity. The current invention provides login to any login interface of an existing application including iOS, Android, Windows and Web (see 4—provides functions that were known to be impossible to do)

The current invention build a new system of authentication based on Bluetooth proximity, and automatically logs the user to his/her old application. Thus, the user is only asked to provide credentials very few times a day (only after he/she leaves proximity of a terminal).

The current invention provides single sign on across multiple application and multiple devices. If the user is logged to an application on a first user authenticated device, the user can login to any other application on any other authenticated device without authentication. It is noted that authenticated devices are paired with the user token, and that pairing is set in a database or through Bluetooth pairing.

Since we know that: 1) the user token is in Bluetooth proximity of the first authenticate terminal where the user is previously logged in, 2) that the new user authenticated terminal must be in Bluetooth proximity of the user token. 3) the user is active, and is in proximity of the first authenticated terminal and of the second authenticated terminal. Therefore, anybody that tries to access the second authenticated terminal will be seen by the user. Also, if the user disconnects from the first terminal, then he will be asked to authenticate to the new terminal.

For example, employee#1 in an office is accessing application#1 on iPad#1 using Bluetooth token#1. Bluetooth token#1 is paired to iPad#1 and PC#1, and can only communicate with iPad#1 and PC#1. If a user#2 uses token#1 to access PC#1, and since user#1 is previously connected to application#1, we know that user#1 is active, and user#2 will be seen by user#1. For that reason, only user#1 can access PC#1.

It is noted that although it is a feature of the solution to minimize authentication for all applications on any of a user's devices, the solution can also be configured to ask for user credentials every time the user makes access from a different device. Also, if the user is actively logged in to a first application on a first authenticated terminal, the user can start any application on the first authenticated terminal without needing to authenticate to the application. It is virtually impossible for a second user to login to the application in the first terminal while the user is logged in. In any case, the Bluetooth login does not add any security risk to the application. Instead, it reduces the security risks.

It is noted that passwords for users of an application are encrypted prior to storing in a database. The encrypted passwords are then loaded to the Bluetooth token over a data network using an encrypted communication such as SSL. The encrypted passwords are then sent to the application security layer using an encrypted Bluetooth channel. The application will have the public key to decrypt the encrypted passwords. Also, each application has a separate public key to decrypt its encrypted passwords.

3) Easy Implementation

The security features of this patent is implemented either through API/SDK or though a wrapper engine.

—API/SDK

The API allows any application to obtain passwords from the Bluetooth token, and to use them for login. Also, it allows the application to detect if authenticate is needed or not, and to detect proximity event.

—Wrapper Engine

The wrapper engine uses a script to automatically combine a wrapper object code and a security layer library together with the object code of an existing application.

The wrapper object code directs the application to use the security layer library functions in parallel with the existing application.

The functions of the security layer library can run on a new thread in parallel with the existing application threads.

The security layer library provides several functions:

a—Load configuration parameters from a database
b—Connects to a Bluetooth token
c—Control a lock screen The security layer controls a lock screen, and forces the lock screen when the user is not authenticated, or when the user leaves proximity of the terminal. When the user authenticates and/or the Bluetooth token is found, the lock screen is removed.

d—Login to a login interface

The security layer thread runs in parallel of the original application, and is trusted to access the application and perform any function.

The thread starts before the main application, and displays the lock screen. In the mean time, it performs several functions:

The very first time the application is launched, or after an application timeout is reaches, the thread will connects to the database to load the parameters The thread will connect to the Bluetooth token If the user is not authenticated, the thread will ask the user for PIN code, for entering credentials, or for doing speaker authentication If the user is authenticated, the lock screen is removed If a login page is detected, the thread will detect the password text field; inject the password and active the login. This causes the user to automatically login to the application.

If a Bluetooth disconnect is detected, the thread will display the lock screen, will alert, call phone, send SMS/Email, etc.

It is noted that it was previously impossible to login to an iPad application due to security restrictions placed by Apple. This new technology is the only technology that enables auto-login to iOS, Android, Web and Windows Exe. The new technology uses a trusted new thread inside the application in order to perform the login. This technology enables to provide password to Windows through the Credentials Provider. Moreover, this technology enables to provide a password to any web page using and adapter that loads the web page that injects the username/password in the username/password text fields.

e—Trigger alerts using alarm, phone calling, emailing, SMSing . . . .

The combination of these features provides a power innovative new security infrastructure with more security and more usability. Also, this new method does not require any changes to the applications, database or network.

f—Provide PKI authentication and digital signing

Figure 1:
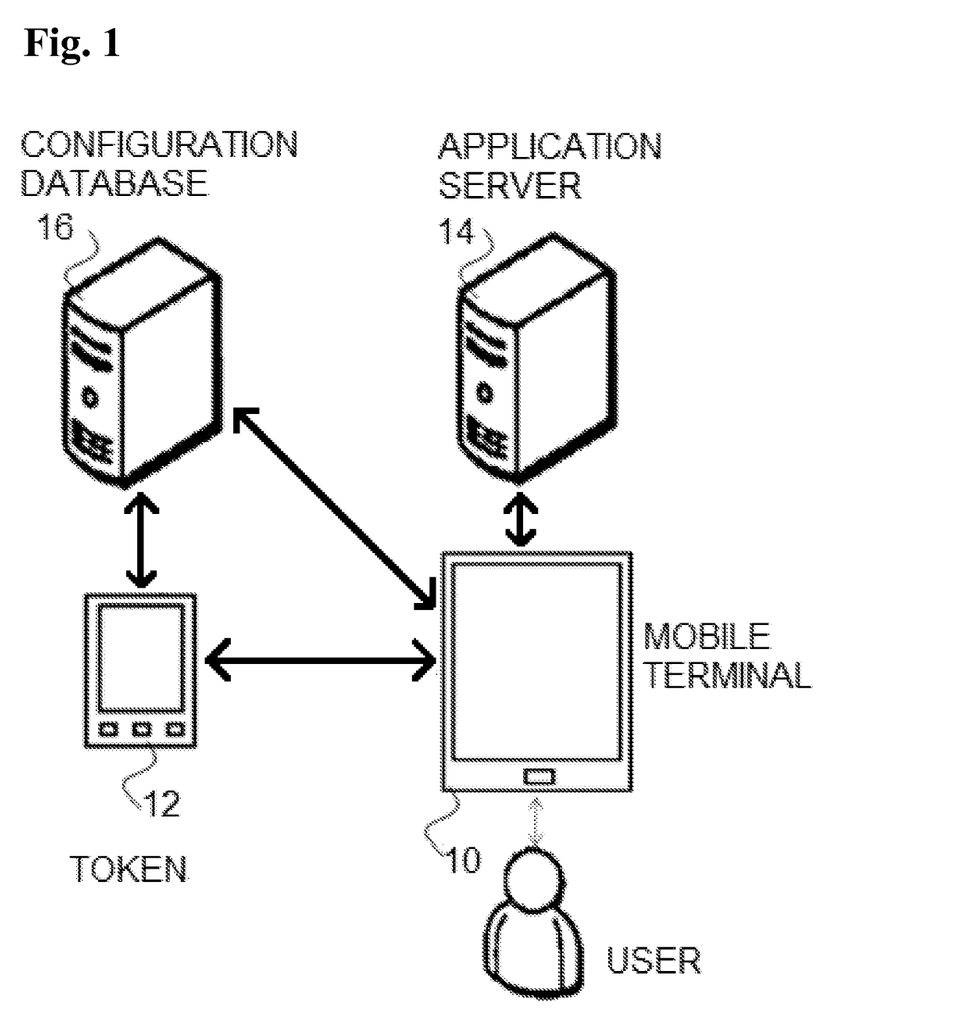
FIG. 1 is a block diagram illustrating the app control process

Referring to FIG. 1, an authentication system according to a first embodiment includes an access device 10, a token device 12, a configuration server 16 and an application server 14.

Token device 12 is a software token application that runs on a smart phone. Token device 12 communicates with configuration server 16 using wireless communication/cellular data communication/intermediary server to obtain token configuration information.

In an alternative embodiment, token device 12 is a fob, with a form factor that can be a Bluetooth keychain, a Bluetooth bracelet, a Bluetooth badge, or a Bluetooth watch. In an alternative embodiment, Token device 12 can be a combination of at least one fob and at least one soft token running on a smart phone. A user can use any one of the fobs or soft tokens interchangeably for authentication. For example, the fob is used when the user starts a remote access session from a smart phone terminal. The soft token is useful when the user starts a remote access session from a tablet.

When token device 12 is a fob, it has a single Bluetooth or Bluetooth LE or other Bluetooth transceiver chipset on the board. It includes a Secure Element, an alarm, and possible an encryption chipset. It will not include any cellular transceiver, 3G/4G transceiver or Wi-Fi. It is generally very small, with volume less than 30 cm3. It does not have an LCD, no display with more than 3 characters and no memory larger than 100 Mega Bytes.

The fob does not allow reset, and it does not allow discoverable mode unless it is updated through an authorized update application. This prevents fraud in case the device is lost.

The fob may provide Bluetooth headset function. In an embodiment, it enables a wire headset to connect to a port. In another embodiment, token device 12 has a foldable or slide able earpiece.

Token device 12 may include a biometric sensor such as a microphone for capturing a sample user voice during initiation and configuration phase. The sample of user voice can be compared to an existing sample of the original user's voice. If correlation factor is above a threshold, the user is authenticated.

The biometric sensor can be an accelerometer for capturing accelerations corresponding to user hand signature and authenticating the user signature against stored user signatures.

The biometric identification signature can be a sample or a pre-processed sample of the user's signature, voice, finger print, iris scan or distinguishing biometric identification.

The identification signature can also include variations that correspond to different user conditions, tones, states, moods, etc.

Upon receipt of an event or a message to authenticate the user or upon detection of an event—such as wrong PIN code, change of driver, reset, detection of unknown conditions, a predetermined period of time elapses, the user may be requested to provide biometric information.

Token device 12 may include an onboard accelerometer, motion sensor or tilt detector. This helps to detect if the user is in motion or idle, and to authorize or deny response depending on if the user is in motion or idle. This is used to reduce a security hack attack "Relay Attack".

It is noted that in case of loss of the Bluetooth token device 12, the user can remove or delete the pairing between its device and access terminal 10. This is generally done by going to the operating system and deleting pairing, removing pairing in a database, changing user configuration information, using an application and requesting removal of pairing, or deleting an application. It is noted that the token device 12 authenticates access terminal 10 every time a connection is requested using device ID obtained from the configuration server.

Access device 10 can be any terminal, console, workstation or mobile device. Access device 10 communicates with configuration server 16 using wireless/cellular data communication or wired communication to obtain configuration parameters. Access device 10 communicates with token device 12 using Bluetooth short range wireless communication to obtain authentication parameters.

Access device 10 communicates with application server 14 using wireless/cellular data communication or wired communication. Access device 10 runs applications or operations that collaborate with application server 14 to provide services to the user such as data, documents, forms, workflows, CRM, payment operations, etc.

Configuration server 16 is a database server that stores configuration parameters.

The wrapper engine can also be part of or can be accessed from the configuration server 16.

App wrapping is the process of applying a management layer to a mobile app without requiring any changes to the underlying application.

App wrapping allows a mobile application management administrator to set specific policy elements that can be applied to an application or group of applications. Policy elements can include such things as whether or not user authentication is required for a specific app, whether or not data associated with the app can be stored on the device and whether or not specific APIs such as copy and paste or file sharing will be allowed. In the enterprise, app wrapping allows an administrator to take an application, associate extra security and management features with it and re-deploy it as a single containerized program in an enterprise app store.

The app is not made secure after it is downloaded onto the device, but before.

Figure 2:
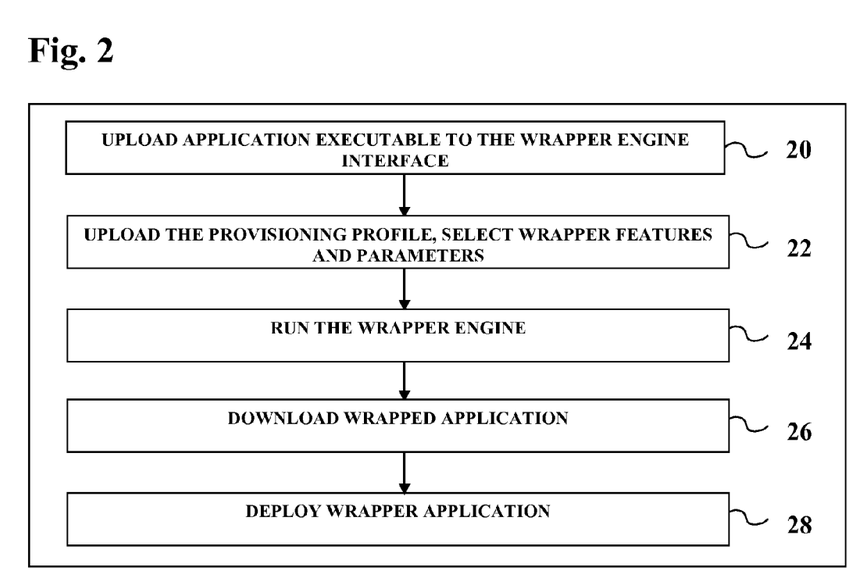
FIG. 2 is a flowchart illustrating the wrapping process

Referring to FIG. 2, the flowchart illustrates the wrapping process. In step 20, the user loads an executable for wrapping. In step 22, the user sets the wrapper parameters such as: features to include in the application, provisioning profile, wrapper parameters. The wrapper may also require information such as the user key pair (private key and public key) and certificate. The wrapping engine may need the private key to sign, and the public key and provisioning certificate to post. The public key may be sent to a certificate authority (CA). In step 24, the user runs the wrapper engine, and in step 26, the user downloads the wrapped application. In step 28, the user deploys the wrapped application.

Figure 3:
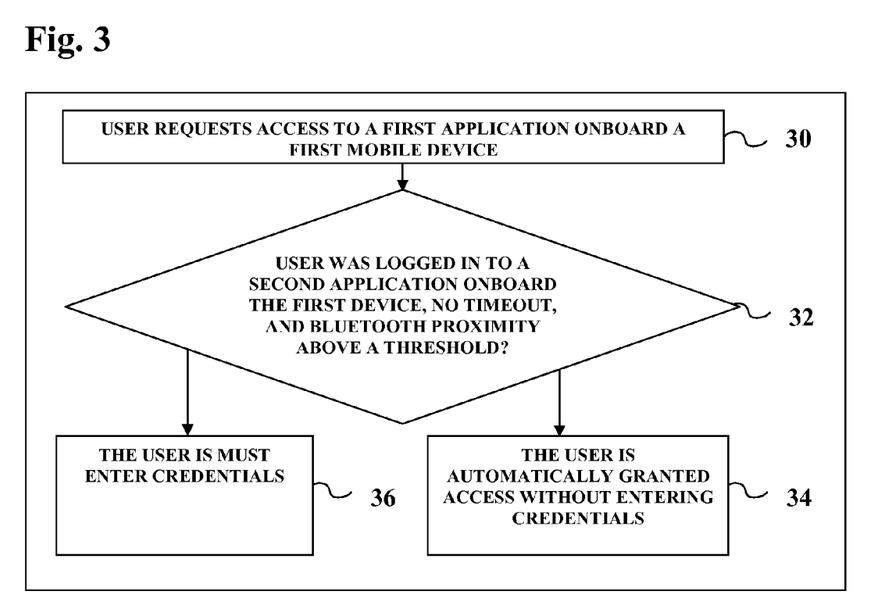
FIG. 3 is a flowchart illustrating single sign on to applications on the same device

Referring to FIG. 3, the flowchart illustrates single sign on to applications on the same device.

In step 30, the user requests access to a first application onboard a first mobile device.

In step 32, 1) if the user was logged in to a second application onboard the first device, and 2) if the period since the login to the second application has not exceeded a threshold, and 3) if the Bluetooth proximity between the first mobile device and the token device has not dropped below a threshold since the login, or if the Bluetooth signal has not disconnected since the last login/authentication or if the time since the last login has not passed a timeout threshold, then in step 34, the user is automatically granted access without the user entering credentials. In step 36, if the user is not currently logged in to a second application onboard the first device, the user must enter credentials.

Figure 4:
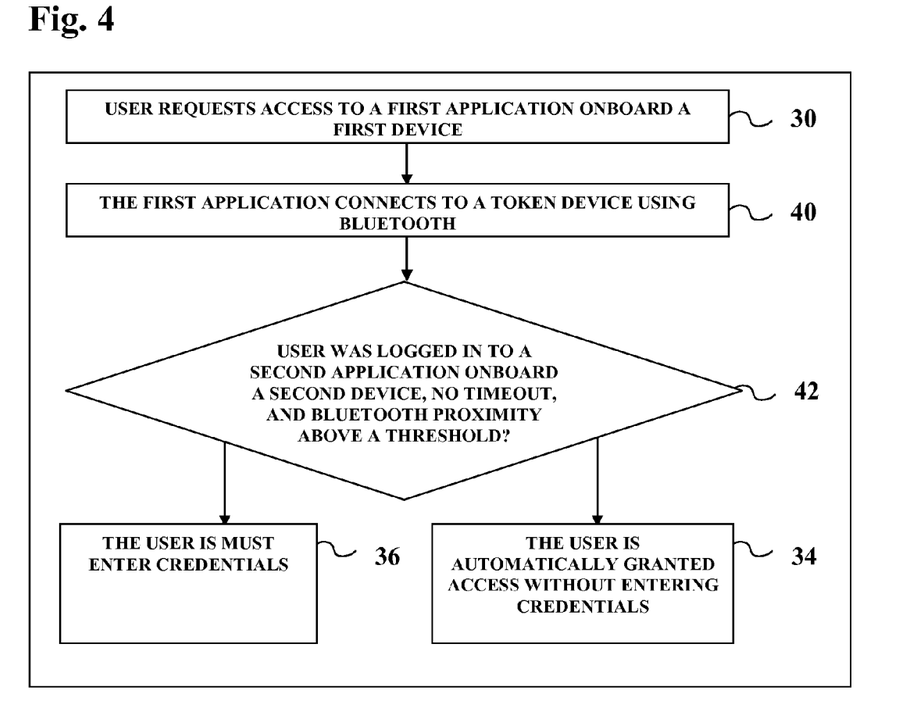
FIG. 4 is a flowchart illustrating single sign on to applications on multiple devices Similar reference numerals are used in different figures to denote similar components.

Referring to FIG. 4, the flowchart illustrates single sign on to applications on multiple devices.

In step 30, the user requests access to a first application onboard a first device.

In step 40, the first device connects to a token device using Bluetooth protocol.

In step 42, 1) if the user was logged in to a second application onboard a second device that is different from the first device, and 2) if the period since the login to the second application has not exceeded a threshold, and 3) if the Bluetooth proximity between the second device and a token device has not dropped below a threshold (the token device is distinct from the first device and the second device), then in step 34, the user is automatically granted access without the user entering credentials.

Since the second device was connected to the token device using Bluetooth, and since the first device is connected to the token device using Bluetooth, then the first device must be in close proximity of the second device, and to the user. Thus, the second device and the token device provide two factors of authentication, and there is no need to request more credentials from the user such as PIN code . . . .

In step 36, if the user is not currently logged in to a second application onboard the first device, the user must enter credentials.

If the remote token device was previously connected to the first terminal using Bluetooth protocol, the second secure application does not request any credential from a user.

If the remote token device was not previously connected to a user terminal using Bluetooth protocol, the second secure application requests at least one credential from the user.

In a preferred embodiment, the token device keeps track of what application the user accessed, when, and if the Bluetooth proximity has dropped below a threshold. This enables to provide single sign on to multiple applications across a same device, and across multiple devices. This enables to minimize the user authentication when the user has already been authentication to a first application on a first device, a threshold period since last authentication was not exceeded, and the user is accessing a second application on a second device that is within close proximity of the first device.

For example, the user runs at least one applications on at least one access device 10. If the user token device 12 stays within proximity of access device 10, the user can launch any number of applications on the first access device 10, or any device that is within predefined GPS proximity of device 10, and the user will not be asked to provide credentials again after a very first login. Only if token device 12 leaves proximity of a user third access device 10, then the current application locks or displays a lock screen, and the next time the user launches an application or performs an operation on the third access device 10, or any other device, then the user will be required to enter credentials. Also, when token device 12 leaves proximity of a user third access device 10, the application on the third access device 10 locks automatically or displays a lock screen automatically.

The current invention ensures that:
1—The application closes the user session if the user walks away, or when the device is separated from the authenticator
2—It alerts when the device is lost
3—It calls for help when the device is left behind un-attended
4—If the device is still not attended to, the device can delete data
5—It provides great user experience through automatic login and single sign on
6—It is easy to implement thanks to a script that injects the security layer directly into any application (iOS, Android, Win and Web).

Token device 12 soft token application authenticates the user using username/password or biometrics, and obtains configuration parameters for the user from the configuration server 16 through wireless communication such as Wi-Fi 3G, 4G . . . . The configuration parameters comprise user credentials, user certificates, user keys, user account information, commands, one time password function, and user rules. The configuration parameters can comprise IDs of token devices 12 that are authorized to obtain configuration parameters from configuration server 16. The configuration parameters can comprise IDs of access devices 10 that are authorized to obtain configuration parameters from token devices 12. Token device 12 generally keeps the user credentials in RAM and does not store them in flash. The soft token generally locks after a predetermined number of hours, generally a day or a week. When the maximum period is reached, the user has to authenticate again. This feature enables to control the soft token through a configuration server, and to manage revocation of user authorizations. For example, if a user leaves the company, the IT administrator can update the user configuration parameters in order to block the user access.

When token device 12 is a fob, it obtains configuration parameters for the user from configuration server 16 through proxy terminal 19. Generally, the user runs an application onboard a user terminal that obtains configuration parameters for the user from configuration server 16 through wired or wireless communication, and that sends the user configuration parameters to token 12 through Bluetooth communication. The user parameters are written to flash memory onboard token device 12.

The configuration parameters can comprise IDs of token device 12 and/or terminals 19 that are authorized to obtain configuration parameters from configuration server 16 or proxy terminal 19.

The configuration parameters can comprise IDs of access devices 10 that are authorized to obtain configuration parameters from token devices 12.

In a preferred embodiment, proxy terminal 19 or relay application runs in a browser on a third device and connects to a remote server using TCP/IP.

While the user token device 12 stays within proximity of access terminal 10, the token device will supply the user credentials automatically to the application. This functionality enables robust multi-factor authentication with high convenience and usability. The current invention provides single sign on to any application on any device. The user logs once, and can have secure multi-factor access to any application without further login. The current invention minimizes the user authentication operations across applications and devices, while maintaining a high level of security, and ensuring that user is authenticated after every time he/she leaves proximity of any one of multiple access terminals 10.

In another preferred embodiment, when the user is idle for a predetermined time—i.e. no typing on a keyboard, or touching a screen, or moving a mouse detected—then access terminal 10 verifies if token device 12 is within proximity by checking Bluetooth signal. This enables to minimize the number of Bluetooth inquiries.

If the user has an active session, and the Bluetooth proximity falls below a threshold (Bluetooth proximity is defined in the Bluetooth proximity profile, and indicates an average distance between two Bluetooth devices), access device 10 performs the following operations:

1) Determines the current location information using a GPS, Wi-Fi triangulation or cell tower. Determine if the current location is a trusted location or not.

A trusted location is generally an office location or home location, where the terminal is permitted to rest, and the user is permitted to walk any distance away from it without triggering any alarm.

Generally, when the user walks away from a terminal in a trusted location, the application would lock.

2) If the current location is not a trusted location, then alarm, lock device and possibly encrypt data. The terminal can also revoke authentication, revoke a user token, cancel a transaction, lock a device or play a long sound file.

3) If the user does not come back to the device within a pre-determined period of time, call the user on his/her mobile phone This function enables to alert the user through the phone ringing/vibrator in case the first device alarm was not heard (in a noisy environment)

4) If the user does not come back to the device within a pre-determined period of time, contact at least one second remote person—generally IT—through mobile phone, email and SMS, describe the problem through voice prompts and text messages, and send the device current GPS location so that a second remote person can try to recover the un-attended device 5) If at least one second remote person cannot be contacted within a pre-determined period of time, perhaps wipe the application data (or encrypt it).

This can be a last resort action to ensure that a device that is left un-attended for a while, and that nobody can attend to it, is automatically wiped. This will ensure that the person that will find it will not find any information on it.

It is noted that the wrapper engine wraps applications with a security layer and that the security layer reads parameters from the configuration database and uses them to configure the security settings on the application. The security layer enables the application will gain the following capabilities:

a. Obtain User Credentials from a Bluetooth Token:

The user credentials are stored in the configuration database, and used by the security layer for login and authentication. The user has a PIN code and a token device 12 for two-factor authentication. Further, the user biometrics can be used for multi-factor authentication.

This feature enables the followings:
   secure the user passwords
   users no longer have to remember numerous passwords or call IT to reset a password
   provide automatic login to applications whereby the user no longer has to enter the password numerous times a day
   different passwords are encrypted with different methods, and the passwords are decrypted by the corresponding security layer. This enables a new level of security never before achieved b. Application is Locked to a Trusted Location The user's trusted locations—generally home locations, work locations—are stored in the configuration database. The trusted locations determine locations where the user is authorized to leave proximity of access terminal 10.

When left in these locations, the application will lock and will not alarm c. Alert Contacts The user's contact information—such as mobile phone number, email—are stored in the configuration database The contact information is used after an alarm occurred, and the user does not come back within a predetermined time period.

The security layer would automatically try to call the user on his/her mobile phone number, in order to get the attention of the user in a noisy environment.

If after a period of time, the user still does not come back, it is determined that the user is not able to attend to the device, and the security layer will try to reach a second remote person or persons d. Bluetooth Token IDs The user's device IDs are stored in the configuration database, and are used by the security layer on token device 10 in order to authenticate token device 12. The security layer obtains the token IDs, connects to a token corresponding to the token IDs and obtains credentials information from authenticated tokens.

If the security layer cannot connect to a first token, it will check if there is another token on record, and it will try to connect to it.

The user's device IDs are also stored in the configuration database, and are used by token device 12 in order to authenticate access device 10.

e. Proximity Distance

When the user walks away from the terminal a predetermined average distance, the Bluetooth proximity falls below a threshold, and the security layer triggers locking policies.

Generally, if the device is in a trusted location, it will lock. If the device is not in a trusted location, it will alarm, call the user, call IT, and then delete data. The application may alert and trigger calls . . . when running in the background.

f. Generate OTP

This security layer can generate a one-time password (OTP), such as SecurID OTP g. Authentication Method The security layer can use different authentication methods including: PIN code, biometrics, speaker authentication such as a voice challenge question that the user has to respond to with his/her voice and with the correct answer. The challenge question is different from a previously issued challenge question This security layer can force the user to run a specific second application on the device, for example a virus scans or encryption software. Otherwise, the application will lock.

A Configuration console or a policy manager is used to set the security policies which are translated into security parameters and stored in the configuration database. The security layer gets the security parameters from the configuration database and executes the corresponding policies on the application.

The wrapper engine takes an application, and proceeds with the following:

1. Deconstructs, unbundles or unpack the application file
2. Un-sign.
   The core object code app may be either disassembled or decompiled to obtain the executable object code. It can be either "native code" (CPU instructions) or byte code (virtual machine instructions, such as Java or .Net). In one embodiment, this may be more of a modification process if the device runs iOS where the disassembly is closer to a process of locating and substituting certain links and terms. However, in general, the disassembly process to obtain the object code of an app after it has been de-capsulated may be done using techniques known in the art, such as using dis-assemblers.

The object code of the first application (or a part of it) may be combined with at least one object code corresponding to a security layer and generating a second secure application. The security layer provides automatic login to existing applications, Bluetooth proximity single sign on, Bluetooth proximity logout, alarming . . . ;

3. Inject new byte code into the old byte code

The app object code is augmented with object code from the security layer. For example, this object code may include class files which are replaced with class files from the security program. The object code generally provides an interface to the mobile device operating system. The app control security program object code is derived, in part, from the policy/meta-data described above. In the case of iOS, the operation is different in that a 'locate and substitute' process occurs rather than an object code replacement. This takes into consideration an interrupt approach that iOS's uses. Generally, the app security program goes through the assembly language code. The specific items located are Software Interrupts (SWIs) within the object code and which are replaced with a branch to an app control security program layer which may then determine what further actions to take, such as making the request, enhancing the results, and others, as described below.

In a preferred embodiment, the security layer library provides the following functions: generate a security layer library that provides functions from the group consisting of: display a lock screen, connect to the remote token device using Bluetooth protocol, detect Bluetooth proximity is below a threshold; obtain a credential from a user, authenticate a user pass code, authenticate a user voice, authenticate a user biometrics, obtain a one-time password, inject a pass code in a login interface, provide single sign-on function, detect a disconnect event, alarm on disconnect, obtain information about the current location, provide public key infrastructure authentication, authenticate a cryptographic token, call a remote device, real-time incident notification, send an email to a remote device, send a Short Message Service message to a remote device;

When the second secure application runs on a terminal, the second secure application provides at least one function of the security layer library that was not provided by the first application.

4. The wrapper inserts system calls to the code at particular locations, and branches them to a security layer application.

The object code from the security layer will run first, and will start a separate thread.

It will control the application by issuing a lock screen or removing it.

When the application is launched or brought to the foreground, the security layer displays a lock screen that prevents the user from accessing the app.

If the user tries to unlock the lock screen, an authentication procedure is initiated, for example, verifying that a Bluetooth token is present within proximity.

Once the user is authenticated, the lock screen is removed, and the user can access the application.

If the security layer detects that the Bluetooth token is not within proximity while the application is in the foreground, the lock screen is displayed, and alarms/alerts are triggered.

If the security layer detects that the Bluetooth token is not within proximity while the application is in the background, the application may ignore the event or the lock screen is displayed, and/or alarms/alerts are triggered.

If the security layer detects that the Bluetooth token after alarms are triggered, or if an unlock code is entered, the security layer stops alarming.

The object code from the security layer will have a second objective, that of feeding the username/password to the application.

After removing the lock screen, the security layer will trigger a process that will supply the user credentials obtained from the database to the username and password text fields, and that will activate the login button.

The field with the secured characters is the password field. The other field is the username field.

After the credentials (username, password) are provided to the login screen, the original application user interface is displayed with access to data, application server, network services, etc. The user interface is the same as the one provided by the original application when the user logs in manually with username password.

5. house cleaning, example, on Android, get old starting activity name from AndroidManifest.xml and store it security layer activity 6. The app is then re-constructed, re-bundled or re-packed 7. Sign the application with a key The key can be different from the original keys It is noted that the wrapper engine will need to sign that application using the new user's certificates, key pair, provisioning profile, etc.

The application can be an application for iOS (for the iPhone), Android (used on handsets from various manufacturers), Windows Mobile 7, Web O/S, Palm, and others.

The current invention consists of inserting a generic security layer into any application without understand the code, and without understanding which modules perform which functions.

Also, given that many enterprise applications have password protection, the current wrapper will obtain the user credentials from the configuration console, and supply them to the application by setting property values of the username/password objects, and by setting properties on the login button. This provides automatic login once the user has been authenticate by the security layer. This function also provides SSO.

In a preferred embodiment, token device 12 generates one-time passwords on receipt of a request using a local function that runs on the device or a third party API that runs either on the device or on a remote server. Token device 12 sends the one-time password (OTP) to access terminal 10 using Bluetooth communication. The security layer automatically supplies the OTP to the application through keypad commands. In another embodiment, the security layer types the user password together with the OTP.

In another embodiment, token device 12 provides battery status information to the application through Bluetooth.

In another preferred embodiment, the wrapper engine or wrapper script or wrapper web service automatically modifies the icon of the wrapped application to indicate that the wrapped application is secured. The wrapper engine or script puts an overlay on the old icon. When the new application is installed on a device, the modified icon will display.

The details of certain embodiments of the present inventions have been described, which are provided as illustrative examples so as to enable those of ordinary skill in the art to practice the inventions. The summary, figures, abstract and further details provided are not meant to limit the scope of the present inventions, but to be exemplary. Where certain elements of the present inventions can be partially or fully implemented using known components, only those portions of such known components that are necessary for an understanding of the present invention are described, and detailed descriptions of other portions of such known components are omitted so as to avoid obscuring the invention. Further, the present invention encompasses present and future known equivalents to the components referred to herein.

The inventions are capable of other embodiments and of being practiced and carried out in various ways, and as such, those skilled in the art will appreciate that the conception upon which this disclosure is based may readily be utilized as a basis for the designing of other methods and systems for carrying out the several purposes of the present inventions. Therefore, the claims should be regarded as including all equivalent constructions insofar as they do not depart from the spirit and scope of the present invention. The following claims are a part of the detailed description of the invention and should be treated as being included in this specification.

The invention claimed is:

1. A method for updating access security of a first application comprising:
   generating a second secure application that provides at least one function of a security layer library which was not provided by the first application;
   automatically combining at least one part of an object code of the first application with at least one object code, that provides an interface to a mobile device operating system, corresponding to the security layer library and at least one object code corresponding to a wrapper,
   wherein the wrapper can call at least one function of the security layer library;
   whereby when the second secure application runs on a first terminal:
   the second secure application automatically obtains a pass code from a remote token device,
   wherein the remote token device is selected from the group consisting of:
   a smart phone, a Bluetooth keychain, a Bluetooth bracelet, a Bluetooth badge, or a Bluetooth watch,
   wherein the remote token device stores user configuration parameters,
   whereby the second secure application uses the pass code to automatically login to a first login interface,
   wherein the first login interface corresponds to a login interface of the first application and the second secure application displays a user interface of the first application.

2. The method of claim 1 whereby:
   the second secure application obtains an identifier from a remote storage device and connects to a remote token device using Bluetooth protocol,
   wherein the remote token device is identified by the identifier.

3. The method of claim 2 whereby:
   if the remote token device was previously connected to the first terminal using Bluetooth protocol,
   the second secure application does not request any credential from a user;
   whereby if the remote token device was not previously connected to a user terminal using Bluetooth protocol, the second secure application requests at least one credential from the user.

4. The method of claim 2 whereby:
   if the remote token device was previously connected to a second terminal using Bluetooth protocol,
   the second secure application does not request any credential from a user;
   whereby if the remote token device was not previously connected to a user terminal using Bluetooth protocol, the second secure application requests at least one credential from the user.

5. The method of claim 2 comprising:
   obtain a user credential information from the remote token device using Bluetooth protocol and obtain at least one pass code,
   wherein if the user credential information is encrypted, the user credential information is decrypted to obtain the at least one pass code.

6. The method of claim 2 comprising:
   monitor Bluetooth proximity between the first terminal and the remote token device,
   wherein after detecting the Bluetooth proximity between the first terminal and the remote token device is below a threshold,
   display a lock screen.

7. The method of claim 6 whereby:
   after detecting the Bluetooth proximity to the remote token device is below a threshold:
   an alert can be issued,
   whereby if after a predetermined period of time the remote token device is not detected and a disable alarm code is not entered:
   the second secure application triggers calling at least one first number, wherein the at least one first number is obtained from a remote configuration server;
   whereby if after a predetermined period of time the remote token device is not detected and a disable alarm code is not entered:
   the second secure application can trigger calling at least one second number and can issue an audible alert comprising indications of the current location,
   the second secure application can trigger sending at least one Short Message Service message comprising indications of the current location,
   the second secure application can trigger sending at least one email message comprising indications of the current location;
   whereby if after a predetermined period of time the remote token device is not detected and a disable alarm code is not entered,
   the second secure application can delete data.

8. The method of claim 2 comprising:
   generate a one-time password,
   wherein the one-time password is different from a previously generated one-time password;
   obtain a user credential information from the remote token device using Bluetooth protocol,
   obtain a pass code from the user credential information,
   wherein if the user credential information is encrypted, the user credential information is decrypted;
   use the pass code and the one-time password to provide access to the first login interface.

9. The method of claim 2 whereby:
the second secure application obtains battery status information from the remote token device using Bluetooth protocol.

10. The method of claim 2 whereby:
if the second secure application cannot connect to the remote token device using Bluetooth protocol, the second secure application connects to a second remote token device.

11. The method of claim 1 whereby:
the second secure application issues a challenge question to the user,
  wherein the challenge question is different from a previously issued challenge question;
whereby if a voice response matches a voice template corresponding to the issued challenge question,
provide access to the first application.

12. The method of claim 1 whereby:
the second secure application obtains reporting parameters from a remote storage device, generates reports according to the reporting parameters, and sends the reports to an address obtained from the remote storage device.

13. A method for updating access security of a first application comprising:
generating a second secure application that provides at least one function of a security layer library which was not provided by the first application;
using a script or a web service to combine at least one part of an object code of the first application with at least one object code, that provides an interface to a mobile device operating system, corresponding to the security layer library and at least one object code corresponding to a wrapper,
wherein the wrapper can call at least one function of the security layer library;
whereby when the second secure application runs on a first terminal,
the second secure application can obtain an identifier corresponding to a remote token device from a remote storage device that stores user configuration parameters,
whereby the second secure application attempts to connect to the remote token device using Bluetooth protocol so as to obtain a pass code to automatically login to the first application,
whereby after detecting the Bluetooth proximity to the remote token device is below a threshold, at least display a lock screen.

14. The method of claim 13 whereby:
after successful connection to a remote token device,
the second secure application can automatically login to a first login interface and display a second user interface,
  wherein the first login interface corresponds to a login interface of the first application;
the second secure application can request a credential from a user,
  wherein said credential is selected from the group consisting of: PIN code, username and pass code, voice response to a challenge question, finger print;
whereby if a connection request to a remote token device fails,
a lock screen is displayed.

15. The method of claim 13 whereby:
after detecting the Bluetooth proximity to the remote token device is below a threshold, display a lock screen.

16. The method of claim 13 comprising:
obtain a pass code from a remote storage device or from the remote token device;
use the pass code to automatically login to a first login interface,
  wherein the first login interface corresponds to a login interface of the first application;
display a second user interface,
  wherein the second user interface corresponds to a user interface of the first application.

17. The method of claim 13 whereby:
if the remote token device was previously connected to the first terminal or to a second terminal,
automatically login to a first login interface and display a second user interface,
  wherein the second secure application does not request any credential from a user.

18. A method for updating access security of a first application comprising:
generating a second secure application that provides at least one function of a security layer library which was not provided by the first application;
automatically combining at least one part of an object code of the first application with at least one object code, that provides an interface to a mobile device operating system, corresponding to the security layer library and at least one object code corresponding to a wrapper,
wherein the wrapper can call at least one function of the security layer library;
whereby after receiving a user request for access to the first application running onboard a first terminal:
the second secure application that runs on the first terminal can obtain an identifier from a remote storage device;
whereby the second secure application connects to a remote token device using Bluetooth protocol,
  wherein the remote token device can correspond to the identifier;
whereby if the remote token device was previously connected to a second terminal that is different from the first terminal,
the second secure application can automatically log a user to the login interface of the first application without requesting any credential from the user;
whereby if the remote token device was previously connected to the first terminal, automatically log a user to the login interface of the first application without requesting any credential from the user.

19. The method of claim 18 comprising:
obtain a pass code from a remote storage device or from the remote token device;
automatically login to the login interface of the first application using the pass code;
display a user interface of the first application.

20. The method of claim 19 comprising:
generate a security layer library that provides functions from the group consisting of:
display a lock screen,
connect to the remote token device using Bluetooth protocol,
detect Bluetooth proximity is below a threshold;
whereby the security layer library can provide a function selected from the group consisting of:
obtain a credential from a user, authenticate a user pass code, authenticate a user voice, authenticate a user biometrics, obtain a one-time password, inject a pass code in a login interface, provide single sign-on function, detect a disconnect event, alarm on disconnect, obtain information about the current location, provide public key infrastructure authentication, authenticate a cryptographic token, call a remote device, real-time incident notification, send an email to a remote device, send a Short Message Service message to a remote device;

use a script or web service to combine at least one part of an object code of the first application with at least one object code corresponding to the security layer library and at least one object code corresponding to a wrapper, wherein the wrapper can call at least one function of the security layer library;

generating a second secure application;

whereby when installed on a terminal, the second secure application has an icon that can be different from the icon of the first application;

whereby when the second secure application runs on a terminal, the second secure application displays a first user interface,
wherein the first user interface corresponds to a user interface of the first application;

whereby when the second secure application runs on a terminal, the second secure application provides at least one function of the security layer library that is not provided by the first application.

* * * * *